(12) United States Patent
Peitz

(10) Patent No.: US 10,976,400 B2
(45) Date of Patent: Apr. 13, 2021

(54) LIGHTING DEVICE HAVING A DIRECTED RADIO SIGNAL FOR POSITION IDENTIFICATION

(71) Applicant: OSRAM GMBH, München (DE)

(72) Inventor: Christoph Peitz, Lippstadt (DE)

(73) Assignee: Osram GmbH, Munich (DE)

( * ) Notice: Subject to any disclaimer, the term of this patent is extended or adjusted under 35 U.S.C. 154(b) by 319 days.

(21) Appl. No.: 15/775,714

(22) PCT Filed: Oct. 24, 2016

(86) PCT No.: PCT/EP2016/075575
§ 371 (c)(1),
(2) Date: May 11, 2018

(87) PCT Pub. No.: WO2017/080805
PCT Pub. Date: May 18, 2017

(65) Prior Publication Data
US 2018/0329014 A1 Nov. 15, 2018

(30) Foreign Application Priority Data
Nov. 13, 2015 (DE) ...................... 10 2015 119 626.3

(51) Int. Cl.
*G01S 1/04* (2006.01)
*G01S 5/14* (2006.01)
(Continued)

(52) U.S. Cl.
CPC ............ *G01S 1/0426* (2019.08); *G01S 1/042* (2013.01); *G01S 5/14* (2013.01); *F21V 21/03* (2013.01);
(Continued)

(58) Field of Classification Search
CPC ..... G01S 1/042; G01S 1/0426; G01S 2201/01
See application file for complete search history.

(56) References Cited

U.S. PATENT DOCUMENTS 5,990,826 A * 11/1999 Mitchell ................. G01S 1/042
342/357.64
9,345,115 B2 5/2016 Mohan
(Continued)

FOREIGN PATENT DOCUMENTS

| EP | 2 902 795 A1 | 8/2015 |
| WO | 2010/064159 A1 | 6/2010 |
| WO | 2015116744 A1 | 8/2015 |

OTHER PUBLICATIONS

PCT; App. No. PCT/EP2016/075575; International Search Report and Written Opinion dated Jan. 25, 2017.
(Continued)

*Primary Examiner* — Cassi J Galt
(74) *Attorney, Agent, or Firm* — Viering, Jentschura & Partner MBB

(57) ABSTRACT

The invention relates to a lighting device for providing a position identification signal, wherein the lighting device comprises a lighting means. A transmitting unit comprising an antenna element transmits the position identification signal in the form of a directed radio signal having a specifiable emission characteristic during intended operation, wherein the position identification signal comprises a position determination data regarding a position of the transmitting unit and/or of the lighting means. The invention further relates to a lighting system having a plurality of lighting devices. In addition, the invention relates to a method for operating a lighting device having a lighting means and a transmitting unit. The method comprises the directed transmitting of a position identification signal in the form of a radio signal having a specifiable emission characteristic, wherein the position identification signal comprises position determination data regarding a position of the transmitting unit and/or of the lighting means.

9 Claims, 11 Drawing Sheets

(51) Int. Cl.
 *F21V 21/03* (2006.01)
 *F21V 23/04* (2006.01)
(52) U.S. Cl.
 CPC ....... *F21V 23/0435* (2013.01); *G01S 2201/01* (2019.08)

(56) References Cited

U.S. PATENT DOCUMENTS

| | | | |
|---|---|---|---|
| 9,746,542 B2 * | 8/2017 | Ikehara | ..................... G01S 1/70 |
| 10,076,015 B2 * | 9/2018 | Bernsen | ................ H04L 63/062 |
| 10,432,239 B2 * | 10/2019 | Peitz | ...................... H05B 47/19 |
| 2012/0194383 A1 | 8/2012 | Kawaguchi et al. | |
| 2012/0218978 A1 * | 8/2012 | Ishidoshiro | .......... H04B 10/116 |
| | | | 370/338 |
| 2015/0002292 A1 | 1/2015 | Cavalcanti et al. | |
| 2015/0279207 A1 | 10/2015 | Breuer et al. | |

OTHER PUBLICATIONS

Eppstein et. al, "Guard placement for wireless localization", arXiv preprint cs/0603057, 2006.

* cited by examiner

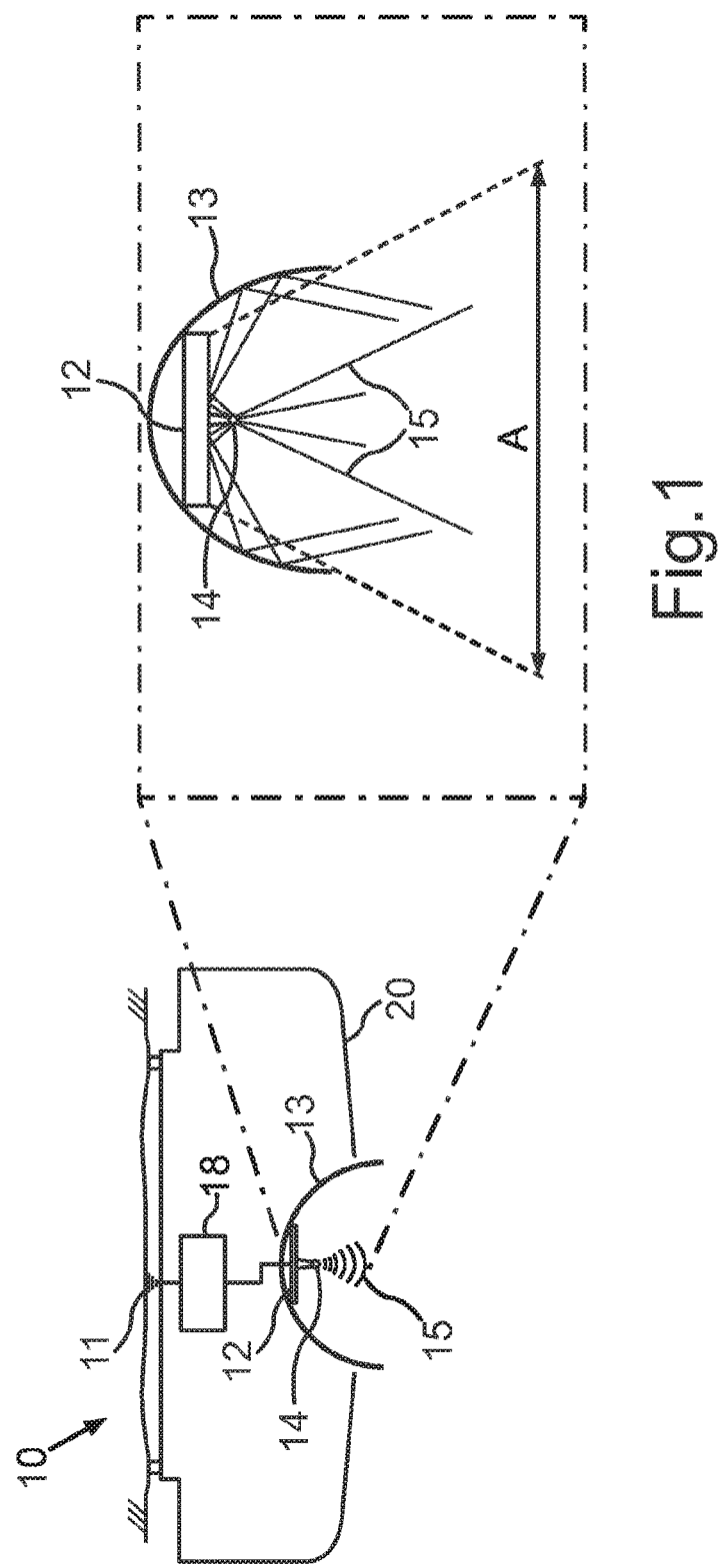

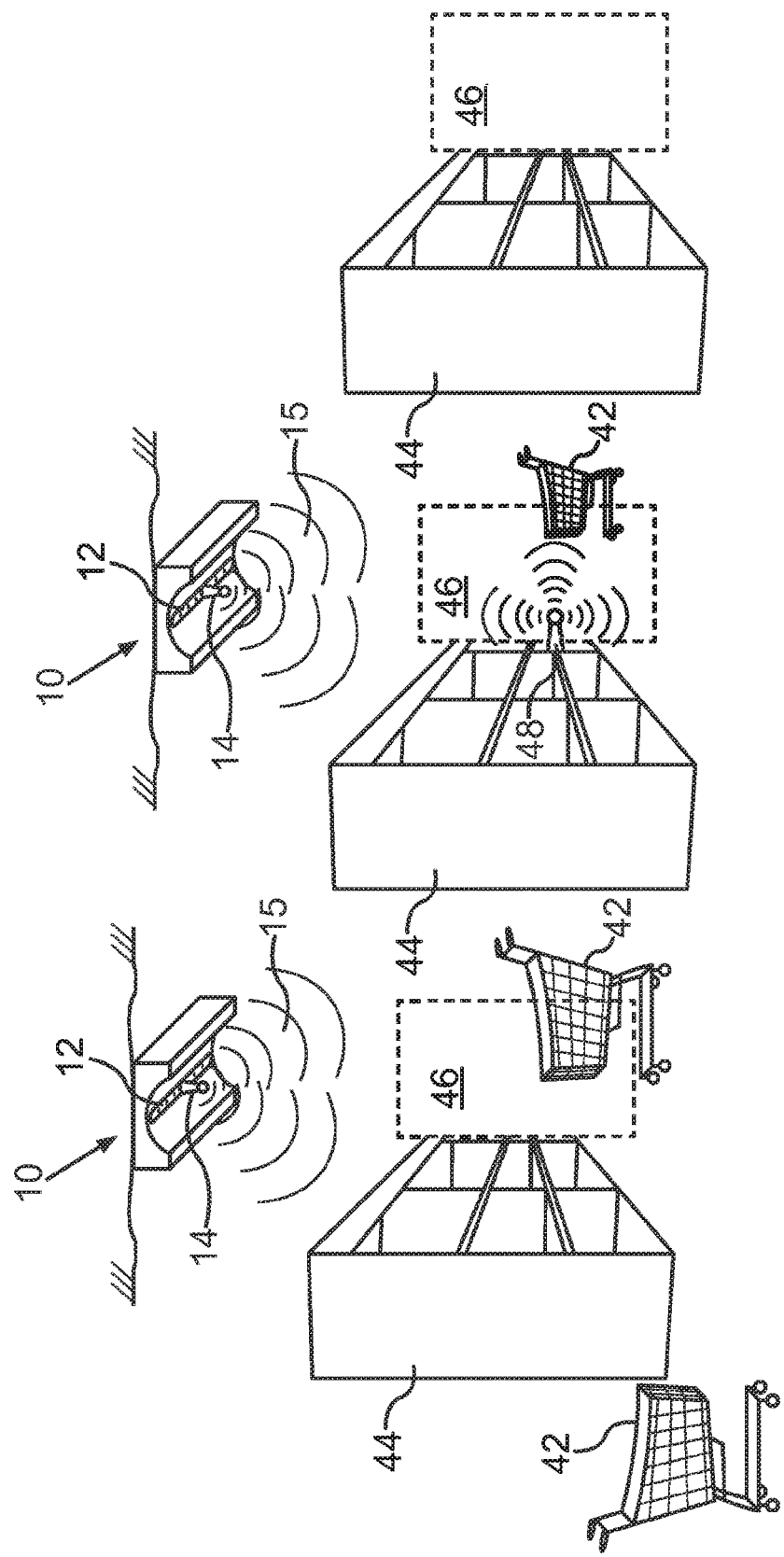

LIGHTING DEVICE HAVING A DIRECTED RADIO SIGNAL FOR POSITION IDENTIFICATION

CROSS-REFERENCE TO RELATED APPLICATIONS

This application is a U.S. national phase application filed under 35 U.S.C. § 371 of International Application Number PCT/EP2016/075575, filed Oct. 24, 2016, designating the United States, which claims benefit of German Patent Application No. 10 2015 119 626.3 filed on Nov. 13, 2015.

FIELD

The invention relates to a lighting device for providing a position identification signal according to the preamble of claim 1. Furthermore, the invention relates to a lighting system for providing position determination data including a plurality of such lighting devices. Moreover, the invention relates to a method according to the preamble of claim 15.

BACKGROUND

Known systems for providing position identification signals can be based on a lighting system, which is installed in a preset area. Within this area, humans and apparatuses optionally have the challenge to orient themselves, to navigate and to find access to and to use further local digital services, for example by means of an application software (app) or app functions, "Google Maps", "Lightify" light controls. Such apparatuses can for example be smart phones, tablet PCs or smart watches. Usually, the layout of the area is stored and retrievable in digital form, for example on a server accessible via the Internet or in a cloud or on another mobile or local storage, to which the apparatus can access. Thus, the lighting installation in an area becomes an orientation system. Thereby, self-location of the apparatus is allowed. On this basis, services can now be realized such as for example navigation or the provision of location-specific information.

In this context, from WO 2015/116744 A1, a system is known comprising a lamp diffusing panel including a surface, which has an encoded position data pattern, a mobile communication apparatus including a camera and a screen display, a data storage, which includes datasets, which represent a ground plan of a building or an arrangement, wherein the mobile communication apparatus is in data communication with the data storage, as well as an application of the mobile communication apparatus, wherein the application is adapted to decode the encoded position data pattern and to localize the decoded position data on the ground plan, wherein the decoded position data is presented on the screen display.

However, for evaluation of such optically encoded position data, a line of sight of the mobile communication apparatus to the respective lamp and in particular orientation of the apparatus within preset limits are required.

Therefore, it is the object of the present invention to provide a lighting device, a lighting system as well as a method, which are more diversely employable with high location accuracy.

SUMMARY

This object is solved by a lighting device having the features of claim 1, a lighting to system having the features of claim 13 as well as by a method having the features of claim 15. Advantageous developments of the present invention are the subject matter of the dependent claims.

The invention is based on a lighting device for providing a position identification is signal, wherein the lighting device includes a lighting means. The lighting device is for example a lamp, in particular a ceiling lamp, which is designed for mounting on a ceiling of a room. The lighting means can be formed as a light emitting diode (LED) module. Similarly, the lighting means can be present in the form of a low-pressure discharge lamp (fluorescent lamp).

The invention is based on the realization that provision of very accurate position identification signals can also be achieved via transmitting units in the form of so-called (radio) beacons if the transmitting units are distributed as homogenously as possible in the concerned area. Ideally, a distance between the individual transmitting units is circa 1 to 5 meters. However, this is not simply realizable in many regions since the transmitting units require a location for their attachment, wherein they are often adhered to shelves for the sake of simplicity. However, there they are exposed to the risk of malicious damage or theft especially in case of a publicly accessible area. Since the transmitting units are often attached to locations, where a possibility of attachment arises, homogeneity of the distribution is not necessarily given, rather, an inhomogeneous distribution is regularly achieved. However, with an inhomogeneous distribution, location becomes more inaccurate, and more transmitting units are overall required. However, a balanced distribution of the transmitting units can be achieved in that the transmitting unit is constructively combined with a lighting device. In this manner, an infrastructure can be provided, which allows both lighting of the concerned area and provision of a position identification signal.

The invention is based on the further realization that commercial transmitting units for providing position identification signals, for example BLE (Bluetooth Low Energy) beacons, emit a spherically propagating signal viewed in simplified manner. This can be problematic since the signal thus is influenced by items such as for example shelves in uncontrolled manner and thus location can be disturbed. The signal strength decreases inversely proportional to the distance. This effect can be used to determine the distance to the transmitting unit via the transmitter strength, wherefrom an accurate position can later be ascertained. However, especially in corridors, it can be well desired that the signal does not exhibit a circular or spherical propagation characteristic, but exhibits an elliptical decrease of the signal strength, thus faster along one axis, than in an axis orthogonal thereto.

Therefore, the lighting device is developed according to the invention by a transmitting unit including an antenna element, wherein the transmitting unit is adapted to transmit the position identification signal in the form of a directed radio signal with a presettable emission characteristic in intended operation, wherein the position identification signal includes position determination data relating to a position of the transmitting unit and/or the lighting means. By a directed emission of the radio signal, thus, the advantage can be achieved that a disturbing influence by the environment, in which the transmitting unit is installed, is reduced and thus higher accuracy of position determination is allowed. Thereby, more diverse possibilities of employment are opened with high location accuracy. Preferably, it can be provided that the presettable emission characteristic is variable during the intended operation. Such a variability of the emission characteristic can for example be effected by manual adjustment. Similarly, it can be provided that the emission characteristic is variable via a mechanic and/or electrical adjusting device.

In an advantageous development, the lighting device is formed for ceiling mounting, wherein the transmitting unit altogether or at least the antenna element effective for the emission of the position identification signal is arranged at lowest location in an intended installation position. Therein, the intended installation position of the lighting device is defined such that the lighting device directs the predominant part of the generated light flux towards the floor of a room with mounting on a ceiling of the room. Thus, in this installation position, the transmitting unit also points towards the floor. The emission characteristic of the transmitting unit can therefore be influenced via the arrangement of the transmitting unit at the lighting device. Thereby, the radio signal can be directed into a presettable direction, in particular directly to the bottom, for example in connection with a metal housing of the lighting device.

In a further advantageous embodiment, the transmitting unit or at least the antenna element effective for the emission of the position identification signal is disposed at an edge of the lighting device, in particular at a corner of the lighting device. Such an arrangement is in particular advantageous in connection with a lighting device, which comprises a metal housing. With a rectangular lighting device, for example with a so-called linear fluorescent luminary, the arrangement of the transmitting unit can be used for specifically influencing the characteristic radio propagation. With such an attachment that the antenna element is the lowest element in a lighting device installed on the ceiling, thus, radio interactions with other elements of the lighting device, in particular in horizontal direction, can be minimized.

With an arrangement of the transmitting unit at a short edge of the lighting device, a greater propagation of the signal is effected in the direction of the longer edge than in the direction of the free field on the side of the short edge. Thereby, a characteristic trapezoidal or egg-shaped radio signal field arises, which is in particular advantageously employable for room corners and corridor ends. For achieving a symmetrical, in particular an elliptical radio signal field, it can be provided that the transmitting unit is arranged in the center of the lighting device. This is in particular suitable for the employment in the center of a room, preferably in the center of a corridor.

In a further advantageous embodiment, the transmitting unit is arranged displaceably supported on the lighting device. By means of an adjusting device, by which the transmitting unit can be displaced, thus, an individual adjustment of the emission characteristic for generating a desired radio signal field is possible.

In a further advantageous embodiment, the lighting device comprises an exterior housing of an electrically non-conducting material, in particular plastic, wherein the transmitting unit is arranged within the exterior housing. An arrangement of the transmitting unit within the exterior housing is to be preferred if a particular protection of the transmitting unit is required. Thereby, the transmitting unit can additionally be disposed optically hidden, which can in particular be convenient with a lighting device as a design-characterized item due to aesthetic design specifications. The arrangement can in particular also be convenient if a wide unrestricted radio signal field of a transmitting unit to the bottom is required.

In a further preferred embodiment, the transmitting unit or at least the antenna element of the transmitting unit effective for the emission of the position identification signal is arranged in a preset relative position to the lighting means, in particular immediately on the lighting means. Herein, the lighting means can in particular be a LED lighting means. A LED lighting means can for example be formed of a LED support module in the form of a printed circuit board (PCB), to which one or more LED units are applied. Upon mounting of the transmitting unit on such a LED support module, thus, the transmitting unit is necessarily arranged in an area, which is also provided for the emission of the light with a presettable emission characteristic, namely with a defined light cone. Such a mounting position is therefore preferably suitable to generate a radio signal field geometrically similar to the light cone.

In a further advantageous embodiment, the lighting device comprises a light directing element, which is adapted to respectively direct the predominant part both of the emitted position identification signal and the light emitted by the lighting means. In other words, an overlap of light cone and radio signal field thereby substantially arises in advantageous manner. The light directing element can in particular be formed as an optical reflector, wherein the reflector is preferably formed of metal and/or has a metallic coating. Thereby, the emission characteristic can be varied to the effect that an area of the emitted radio signal is restricted and oriented, respectively, by placing the transmitting unit in a corresponding arrangement to the reflector. Thereby, optical elements can be used at the same time to adapt the propagation of the radio signal field, for example to a similar propagation as the optical path of the light (light cone). The farther the arrangement of the transmitting unit is shifted from a focus of the light directing element or the emission location of the light source, thus for example of the LED, the more the radio signal field shifts, which can be an intended effect. Thus, it can for example also be provided to arrange the transmitting unit on a side of a light directing element to thus achieve unilateral emission of the radio signal and to prevent propagation of the radio signal in the opposite direction, which is shielded by the light directing element.

In a further advantageous embodiment, the antenna element effective for the emission of the position identification signal is adjustable with respect to an emission direction with respect to the lighting device and/or with respect to an aperture angle of an emission cone. In particular, it can be provided that the transmitting unit comprises an own adjusting device for adapting the emission characteristic of the emitted range of the radio signal, which is independent of a light directing element of the lighting device for example in the form of a reflector. Rather, this adjusting device can be provided exclusively for adapting the emission characteristic of the transmitting unit, for example in the form of a shade and/or a reflector. Herein, it can be provided in particularly preferred manner that an adaptation of the emission characteristic can be adjusted for example depending on a ceiling height by means of an arrangement of antenna element and radio reflector variable in a relative position to each other.

In a further advantageous embodiment of the lighting device, the transmitting unit includes a data processing unit for providing the position determination data, wherein the data processing unit is arranged spatially separated from the antenna element. Preferably, a high-frequency generator for generating the electrical signal, which is introduced into the antenna element, and which is part of the transmitting unit, can also be arranged spatially separated from the antenna element, in particular as an assembly constructively combined with the data processing unit. In this manner, greater freedom in the configuration of the component arrangement arises, which is in particular advantageous if only a limited installation place is available at the location, at which the radio signal is to be emitted. The data processing unit can preferably be formed as a microprocessor or microcontroller. In particular, the position determination data can be stored in a data storage of the data processing unit, for example in a RAM (Random Access Memory), ROM (Read-Only Memory), EEPROM (Electrically Erasable Programmable Read-Only Memory) or Flash memory (Flash EEPROM).

In a further advantageous embodiment, the lighting device comprises an electronic operating device for the lighting means, wherein the electronic operating device is coupled between an electrical supply connection of the lighting device and the lighting means. The electronic operating device can in particular be an electronic ballast for a light emitting diode module (LED module). The electronic operating device can advantageously have an interface to an external control device, for example a light management system. Particularly advantageously, it can be provided that the transmitting unit is parameterizable via the interface.

In an advantageous development, the electronic operating device comprises a housing of an electrically non-conducting material, in particular plastic, wherein the transmitting unit is arranged within the housing of the electronic operating device. Thereby, the transmitting unit is particularly well protected from external influences.

Particularly preferably, the transmitting unit is coupled to the electronic operating device for its electrical self-supply. Hereby, a considerably reduced maintenance requirement results for the transmitting units since a battery exchange is no longer required. Thereby, direct accessibility of the transmitting units can also be omitted, whereby greater degrees of freedom with regard to the configuration of the arrangement within the operating device and/or the lighting device arise.

A lighting system according to the invention for providing position determination data results from a lighting system, which includes a plurality of lighting devices according to the invention, wherein the lighting devices are arranged according to a presettable installation scheme for the intended operation, wherein the transmitting power of the respective position identification signals and/or the respective emission characteristic are adjustable depending on an installation height. In this context, the transmitting power does not characterize the average transmitting power, but the transmitting power during the emission of the position identification signal, thus with the transmitting power during a transmitting pulse, in a pulsed transmitting operation, which is usually present in employment of radio beacons for periodic emission of position identification signals. Thus, it is correlated with the amplitude of a corresponding voltage or current signal, which is fed into the antenna element.

By means of an integration of transmitting units in at least a part of lighting devices within an area, this area can now be completely equipped with lighting devices and at the same time with transmitting units. Thereby, a complete coverage of the area, in which the lighting system is installed, with position determination data, which is transmitted via directed position identification signals, which are transmitted via radio, can in particular be achieved. A complete coverage with radio signals for position identification in an area can therefore be influenced based on the lamp installation planning. Depending on the emission characteristic of the transmitting units within the lighting system, which are individually adaptable to the respective installation position, it can for example be provided that lighting devices are arranged corresponding to a two-dimensional grid, in particular an orthogonal grid, wherein preferably a lighting device without transmitting unit and a lighting device of the type according to the invention are respectively alternately arranged respectively along a grid line. In this manner, a complementary arrangement of lighting devices (individual lamps) with and without radio transmitting unit results. Thus, the transmitting units are installed at least in a part of the lighting devices and preferably directly supplied with energy.

Therein, the transmitting units can be adapted to permanently emit an identification number respectively unique within the lighting system via emission of a radio signal, wherein the identification numbers serve as position determination data. Preferably, it is registered on a storage unit, which can be queried by an apparatus of a user, at which point of the area which transmitting unit is to be detected how strongly. Thereto, the entire area is scanned by a corresponding recording apparatus by means of a scan operation to be performed one-time, to record a dataset of signal strengths and identification numbers (ID) referred to as "fingerprint" for each point corresponding to a presettable local resolution, which can be received at the corresponding point. With a sufficiently dense arrangement of lighting devices according to the invention, thus, a characteristic fingerprint respectively arises. By means of such a fingerprint, a receiving apparatus can now send an inquiry to the data storage, which location within the area is correlated with this fingerprint. Thus, a self-location system can be provided by means of the lighting system according to the invention in connection with a corresponding communication apparatus, which has access to a storage content, in which the fingerprints of the respective area are registered, and a navigation functionality can also be provided upon presence of corresponding navigation data.

In an advantageous development, the lighting system is configured such that at least two position identification signals of respectively two different lighting devices of the plurality of lighting devices are receivable at least within 95 percent of an area lighted by the lighting system and/or at least three position identification signals of respectively three different lighting devices of the plurality of lighting devices are receivable at least within 80 percent of an area lighted by the lighting system. In this context, the lighted area is an area associated with the lighting system, for the lighting of which the lighting system was conceived according to the light planning underlying it. Lighted area in this context is therefore to be regarded independently of the fact, which part of the area is actually lighted in the specific situation, for example if a part of the lighting devices is switched off.

The invention is further based on a method for operating a lighting device with a lighting means and a transmitting unit. According to the invention, the method is developed by directed transmitting a position identification signal in the form of a radio signal with a presettable emission characteristic, wherein the position identification signal includes position determination data relating to a position of the transmitting unit and/or the lighting means.

The advantages and features as well as embodiments described for the lighting device according to the invention similarly apply to the lighting system according to the invention and equally to the corresponding method and vice versa. Accordingly, for device features, corresponding method features can be provided and vice versa.

The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be regarded as encompassed and disclosed by the invention, which are not explicitly shown in the figures or explained, but arise from and can be generated by separated feature combinations from the explained implementations.

BRIEF DESCRIPTION OF THE DRAWINGS

Further advantages and features are apparent based on the following description of embodiments considering the attached figures. In the figures, identical reference characters denote identical features and functions.

There is shown in:

FIG. 1 in simplified schematic representation (sectional side view) a preferred first embodiment of a lighting device according to the invention, FIG. 2a in simplified schematic representation (sectional side view) a light directing element according to a preferred second embodiment of a lighting device according to the invention, FIG. 2b in simplified schematic representation (sectional side view) a light directing element according to a preferred third embodiment of a lighting device according to the invention, FIG. 3 in simplified schematic representation (sectional side view) a light directing element according to a preferred fourth embodiment of a lighting device according to the invention, FIG. 4 in simplified schematic representation (sectional side view) a section from a preferred fifth embodiment of a lighting device according to the invention, FIG. 5 in simplified schematic representation (sectional side view) a preferred sixth embodiment of a lighting device according to the invention, FIG. 6 in schematic representation preferred mounting positions of transmitting units at a lighting device,

FIG. 7a,

FIG. 10a,

DESCRIPTION OF THE PREFERRED EMBODIMENTS

Figure 2A:
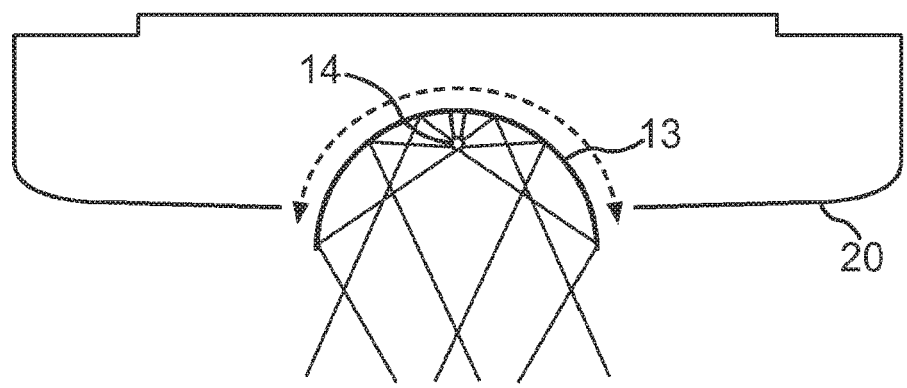

A preferred first embodiment of a lighting device 10 according to the invention is illustrated in FIG. 1. The lighting device 10 includes a lighting means 12, which can for example be constructed of at least one LED, which is arranged on a support module. The support module can be present in the form of a printed circuit board (PCB). The lighting device 10 further includes a light directing element 13, which is formed as a reflector in the present form. Such a reflector is preferably formed of metal or has at least a metallic coating. The lighting device 10 further includes a transmitting unit 14, which is arranged on the lighting means 12 according to the preferred first embodiment. A position identification signal 15 in the form of a radio signal is emitted from the transmitting unit 14, in particular an antenna element of the transmitting unit 14, wherein the radio signal is formed as a directed radio signal with a presettable emission characteristic. Herein, a respective emission characteristic can already be preset by the configuration of the antenna element itself, similarly, it can be provided that the emission characteristic is defined in cooperation with the light directing element 13.

Preferably, the lighting device 10 can comprise an electronic operating device 18 for the operation of the lighting means 12, wherein the electronic operating device 18 is coupled between an electrical supply connection 11 of the lighting device 10 and the lighting means 12. The supply connection 11 can for example be a standard mains voltage connection with 230 Volts/50 Hertz. However, it can also be provided that the supply connection 11 is fed from a DC voltage source, preferably with a voltage between 12 and 48 Vols.

In FIG. 1, a partial view with the transmitting unit 14, the lighting means 12 as well as the light directing element 13 is further illustrated in more detail, in which the beam path of the directed radio signal, which constitutes the position identification signal 15, is exemplarily indicated. Furthermore, a signal cone A is illustrated, within which the propagation of the light emitted by the lighting means 12 and/or the radio signal emitted by the transmitting unit 14 is effected.

By means of an arrangement of the transmitting unit 14 directly on a LED support module, a signal cone A defined by the light directing element 13 can also be used for setting the emission characteristic of the directed radio signal. In this manner, both the emitted light and the radio signal can substantially propagate within the same signal cone A.

In a preferred second embodiment, the light directing element 13 is formed as a curved reflector without kinks and bending edges, for example with a parabolic formation in the side view illustrated in FIG. 2a. The lighting device 10 can, as already previously illustrated in side view in FIG. 1, be formed as a linear fluorescent luminary, in which the light directing element 13 has the shape of a segment of a tubular reflector.

Herein, the light directing element 13 can preferably be pivotably arranged such that a detent degree of freedom for modifying the radio signal field is allowed. As already in the representation before, here too, the transmitting unit 14 can be formed on the lighting means 12 in the form of a LED support module with LED elements applied thereto.

Figure 2B:
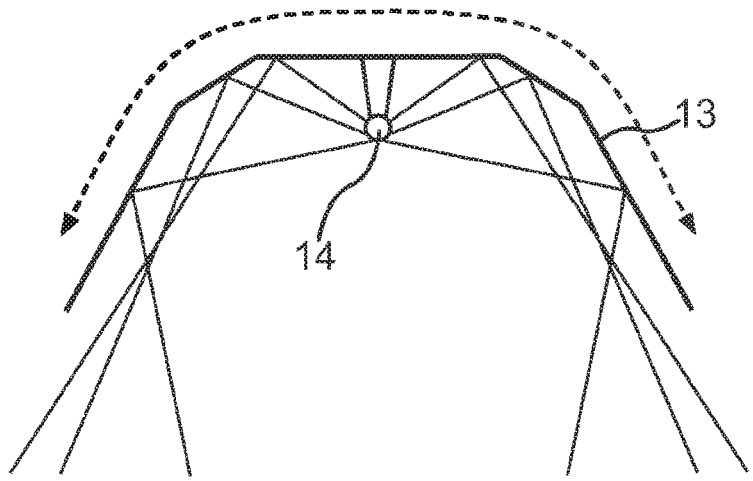

In an alternative preferred third embodiment according to the representation in FIG. 2b, the light directing element 13 can be formed of a metallic reflector, that is that the reflector is composed of a metallic material or is provided with a metallic to coating. For example, the light directing element 13 can be manufactured from a bent sheet metal in this configuration, which has bending edges at presettable locations and forms a respectively flat partial surface between these bending edges.

As already in the second embodiment, which is illustrated in the preceding FIG. 2a, in this configuration too, the light directing element 13 can also be configured in adjustable, that is pivotable, manner, whereby the directed radio signal can be modified.

Figure 3:
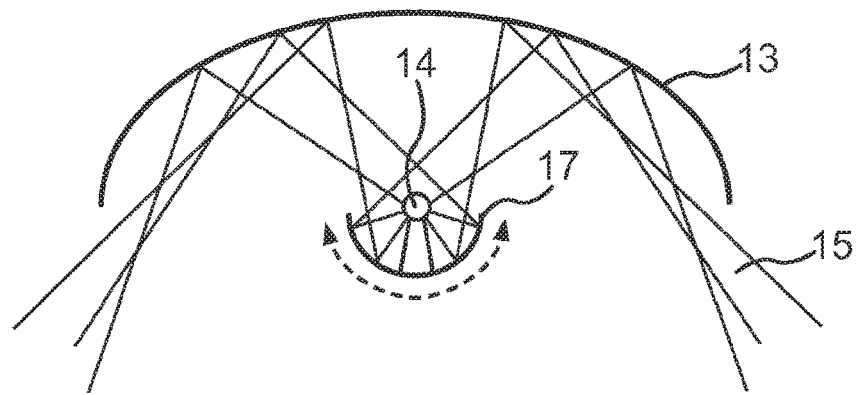

In a preferred fourth embodiment according to the representation in FIG. 3, the transmitting unit 14 is arranged on a radio reflector element 17, which is adjustable in its orientation. The radio signal already directed in a first stage now impinges on the light directing element 13 and is now once again reflected in a second stage. In this manner, an indirect propagation of the radio signal can be achieved.

Figure 4:
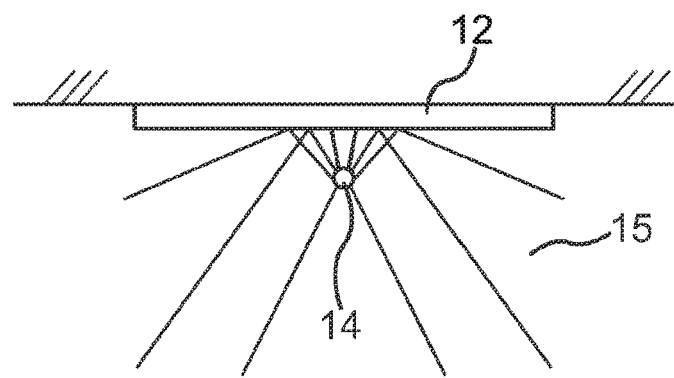

By means of a preferred fifth embodiment according to the representation in FIG. 4, a further possibility of the directed emission of the position identification signal 15 as a directed radio signal is in arranging the transmitting unit 14 on the lighting means 12 such that conductive elements of the lighting means 12 can be used for reflecting the radio signal such that in an arrangement, in which the lighting means 12 emits to the bottom, propagation of the radio signal to the top is prevented by shielding the radio signal in this detection range. Preferably, this can be effected by a particular metallic shielding surface on or within the lighting means 12, for example on or within the support module (printed circuit board) in a LED lighting means, which is constructed in the form of LED components on a support module.

Figure 5:
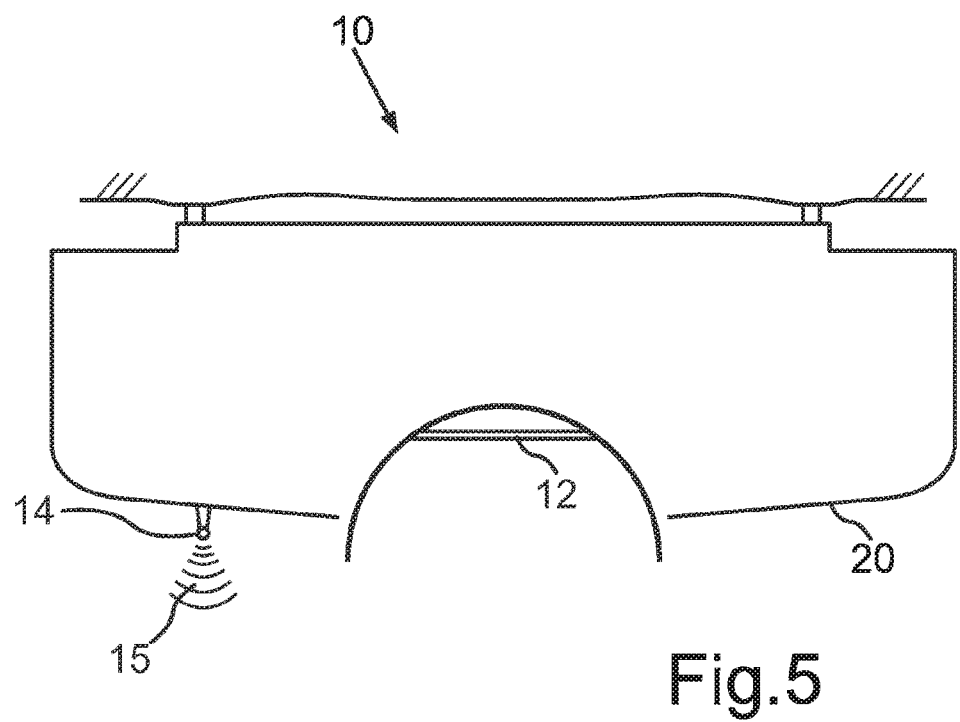

According to a preferred sixth embodiment of a lighting device 10 according to the invention, as illustrated in FIG. 5, the transmitting unit 14 can be arranged on the exterior housing 20 of the lighting device 10 independently of the lighting means 12. In an intended arrangement of the lighting device 10, which is formed as a ceiling lamp for ceiling mounting in the illustrated form, the transmitting unit 14 can be arranged at lowest location of the lighting device 10. For achieving a wide emission characteristic of the position identification signal 15, herein, it is not required that the transmitting unit is actually arranged at the lowest location viewed over the entire length and width of the lighting device 10, rather, it can be provided that the transmitting unit 15 is not overhung to the bottom by any elements of the lighting device 10 impeding or disturbing the radio signal propagation within a presettable perimeter.

Figure 6:
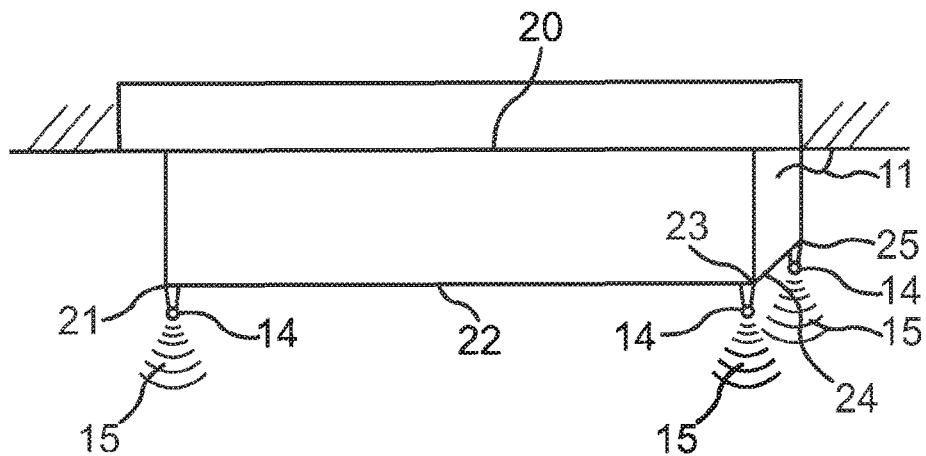

Preferred mounting positions of transmitting units at lighting devices corresponding to the representation in FIG. 6 can be provided such that the transmitting units 14 are arranged at edges 22, 24 and/or corners 21, 23, 25 for emitting position identification signals 15. Such an arrangement is particularly preferably provided in an exterior housing 20 of the lighting device 10, which is manufactured of a metallic material. If the transmitting unit 14 is arranged as a lowest element, minimization of radio interactions can hereby be achieved.

Figure 7A:
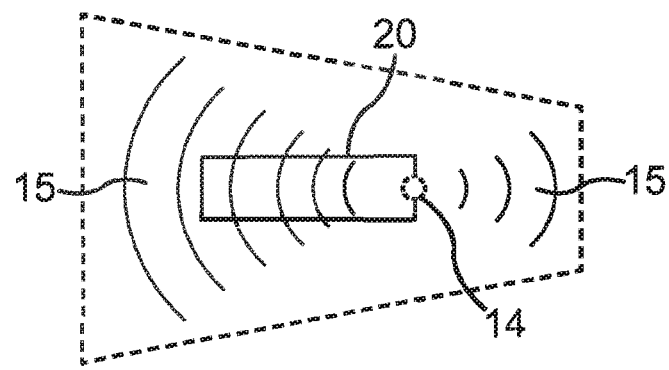
Figure 7B:
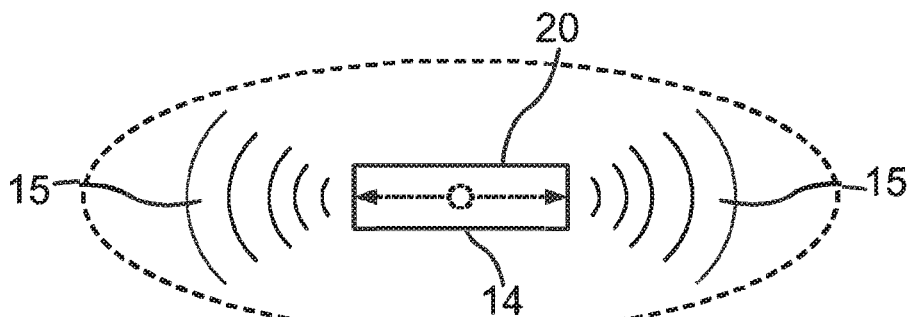
FIG. 7b in simplified schematic representation a characteristic radio propagation in different mounting positions of the transmitting unit at a lighting device, FIG. 8 in simplified schematic representation (sectional side view) a preferred seventh embodiment of a lighting device according to the invention, FIG. 9a in simplified schematic representation (sectional side view) a preferred eighth embodiment of a lighting device according to the invention, FIG. 9b in simplified schematic representation (sectional side view) a preferred ninth embodiment of a lighting device according to the invention.

Especially in using a metallic lamp housing as an exterior housing 20, the characteristic propagation of the position identification signal 15 can be additionally influenced via the arrangement of the transmitting unit 14 at the exterior housing 20. In the representation in FIG. 7a, the transmitting unit 14 is arranged at a short edge of the exterior housing 20 of the lighting device 10. Hereby, a trapezoidal radio signal field arises, in which the radio signal propagates greater by the influence of the exterior housing 20 than in the opposing direction to the right, thus in the direction towards the free space. For comparison, a corresponding propagation characteristic with a transmitting unit 14 centrally arranged on the exterior housing 20 of the lighting device 10 is illustrated, which results in a symmetrical, elliptical radio signal field. According to the representation in FIG. 7b, herein, the propagation of the position identification signal 15 occurs identically strongly in both directions, to the left and right. Due to the shorter dimension of the exterior housing 20 of the lighting device 10, herein, propagation of the radio signal occurs considerably attenuated in a transverse direction orthogonal thereto (in the drawing plane) than in the primary propagation direction. This characteristic for example complies with a mounting of linear fluorescent luminaries in corridors. Therefore, it can particularly preferably be provided to adapt the emission characteristic depending on the found environmental conditions with an already mounted lighting device 10 and to form a possibility of adjusting of the detent position of the transmitting unit 12 at the lighting device 10. For example, an adjustment can be effected via a rail system. In case of an electrical supply of the transmitting unit 14 from the lighting device 10, herein, the supply of electrical energy can for example be effected via a trailing cable or a slider contact path.

Figure 8:
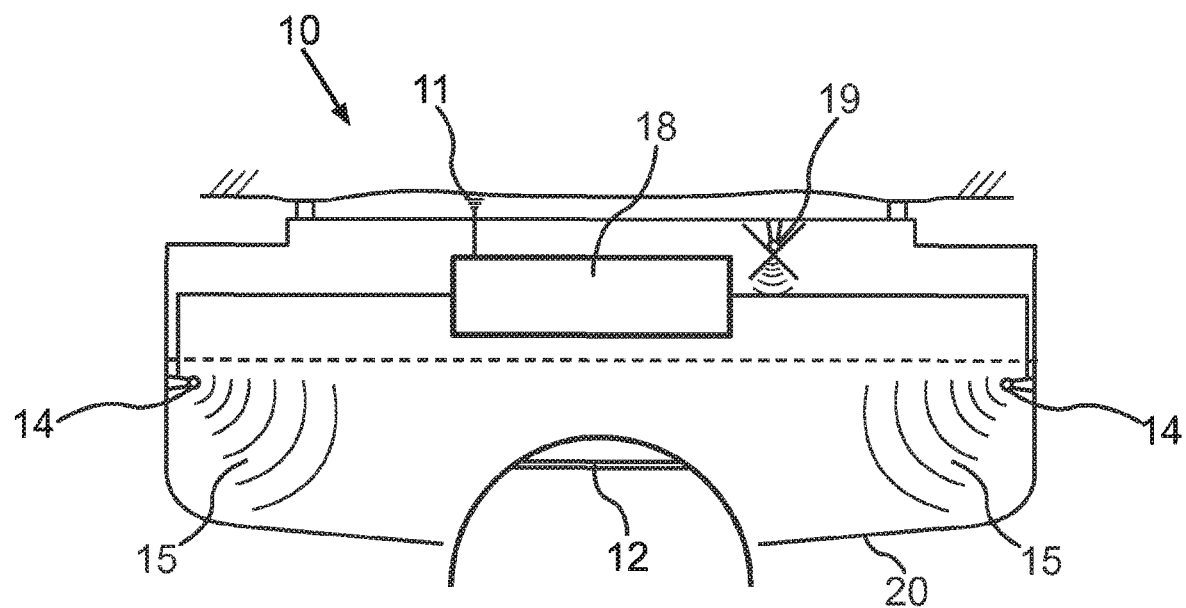

According to a preferred seventh embodiment of a lighting device 10, an electronic operating device 18 is arranged within the exterior housing 20, which is for example composed of a material with a low attenuation for the position identification signal 15, for example of plastic, which is coupled to the electrical supply connection 11. The electronic operating device 18 can in turn comprise a housing of a metallic material, in particular a sheet metal housing, on the one hand. In this case, it is convenient if the transmitting unit 14 is arranged below the electronic operating device 18 to avoid a lateral reflection of the position information signal 15 on a housing wall of the operating device 18. Herein, mounting of the transmitting unit 14 on a lateral inner wall of the exterior housing 20 can be advantageously used for the unimpeded emission of the position information signal 15. For example, mounting of the transmitting unit 14 on the right and/or on the left side of the exterior housing 20 can be provided. Mounting on a top side of the lamp in a position 19 according to the representation of FIG. 8 is less well suitable for the already mentioned reasons.

Figure 9A:
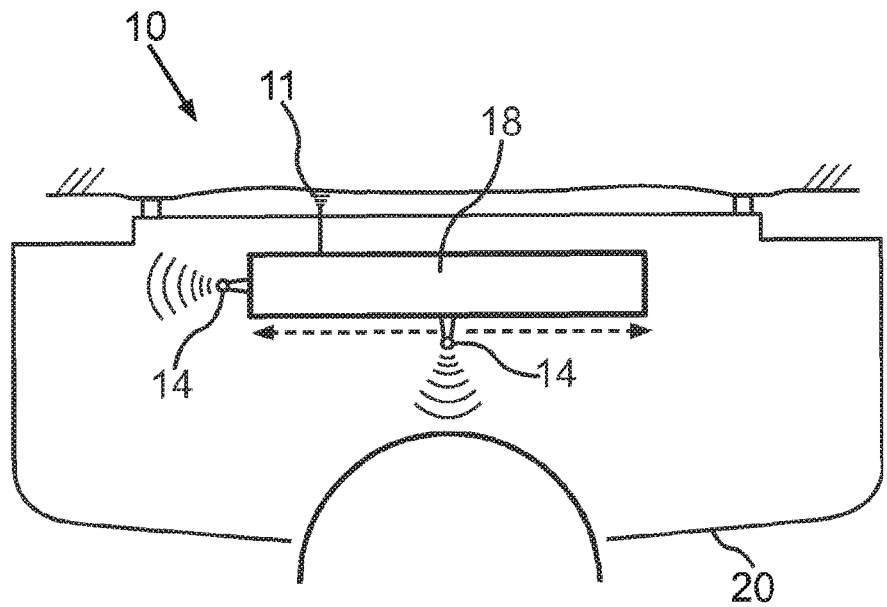

In a preferred eighth embodiment of a lighting device 10 according to FIG. 9a, the transmitting unit 14 is arranged on a housing of the electronic operating device 18, wherein the housing of the electronic operating device 18 is preferably manufactured of a metallic material. As already in the previously illustrated seventh embodiment, the exterior housing 20 is manufactured of a material not or only insignificantly attenuating the radio signal propagation, for example plastic, in the eighth embodiment too. As also in mounting on a metallic exterior housing 20 of the lighting device 10, it can also be provided in mounting on the electronic operating device 18 to arrange the transmitting unit 14 displaceably on the housing of the electronic operating device 18.

Figure 9B:
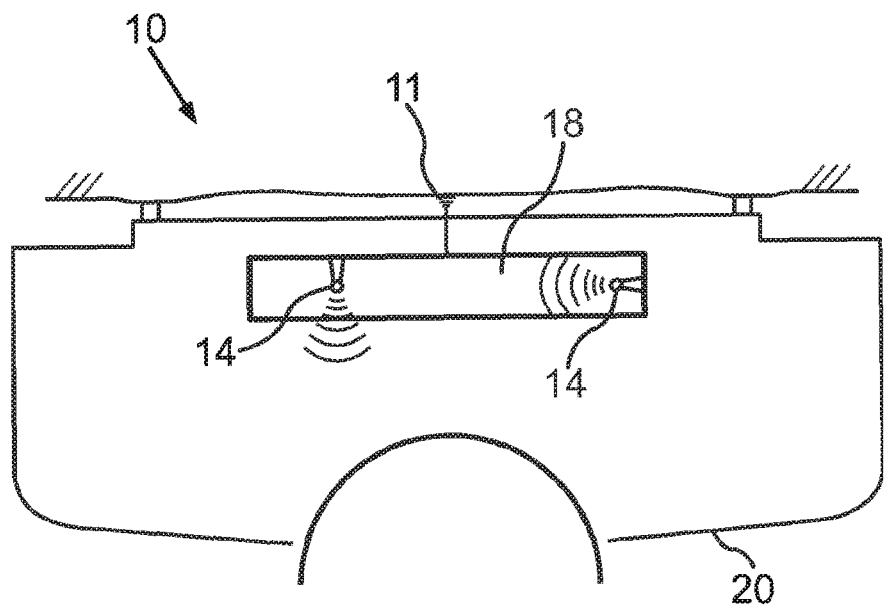

In case that the housing of the electronic operating device 18 is not composed of a metallic material, that is this housing effects low attenuation for a radio signal, the transmitting unit 14 can preferably be arranged within this housing in a preferred ninth embodiment. In this manner, diverse advantages with regard to connection of the transmitting unit 14 to the electronic operating device 18, for example with respect to the energy supply and/or provision of data from a superordinated control or the electronic operating device 18 itself, arise. Furthermore, there arises the advantage of a particular protection, in particular a mechanic protection, of the transmitting unit 14 from external influences. Possible arrangements of the transmitting unit 14 within the electronic operating device 18 are illustrated in FIG. 9*b*.

Figure 10A:
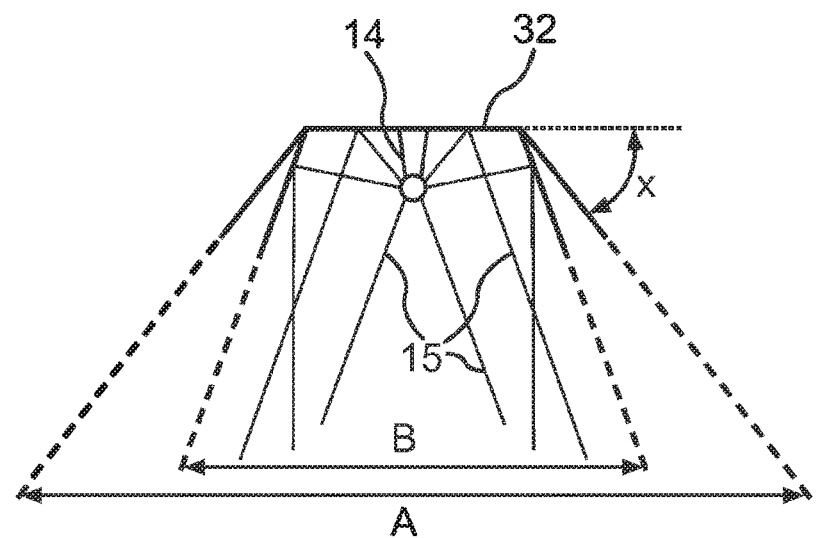
Figure 10B:
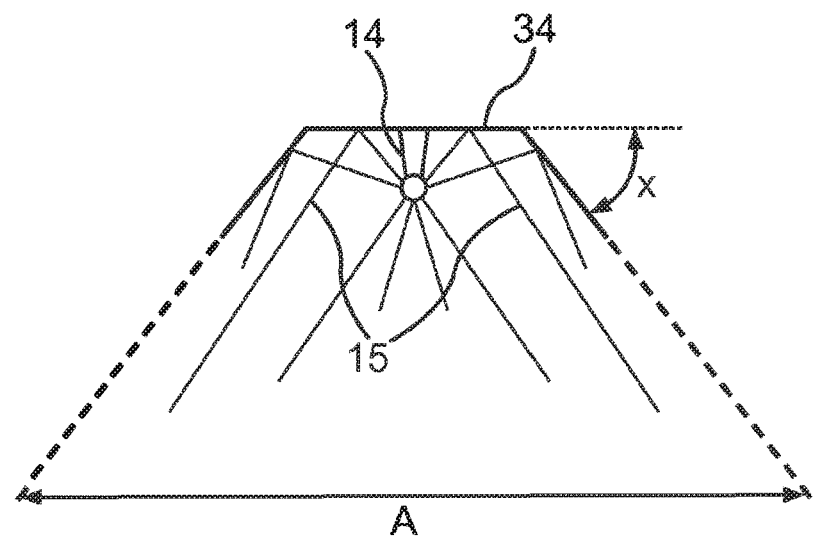
FIG. 10b in simplified schematic representation (sectional side view) arrangements of an antenna element, which allow adjustability of the emission direction and/or the aperture angle of an emission cone, FIG. 11 in schematic representation an exemplary scenery in a supermarket, in which lighting devices according to the invention are employable, FIG. 12a in simplified schematic representation an arrangement of transmitting units with a wide emission cone, FIG. 12b in simplified schematic representation an arrangement of transmitting units with a directed signal cone adapted appropriate to installation situation, and FIG. 13 in simplified schematic representation a preferred embodiment of a lighting system according to the invention.

According to a further preferred embodiment corresponding to the representation in FIG. 10*a*, the transmitting unit 14 is arranged at a reflection device 32 exclusively provided for itself. Herein, the transmitting unit 14 is arranged within a U-shaped profile with foldable side surfaces, the angle x of which is adjustable. Thus, in a first adjustment of the reflection device 32 for propagation of the position identification signal 15, a signal cone A can be generated, wherein a narrower signal cone B can be generated in a second adjustment. In particular, it can be provided that both sidewalls are adjustable independently of each other (compare representation in FIG. 10*b*). By means of this adjustability, the radio signal field can for example be modeled with different ceiling heights.

For each of the above illustrated preferred embodiments, it can be provided to provide an interface for energy supply from the electronic operating device 18 and/or an interface for data exchange with the electronic operating device 18. In the figures, the transmitting unit 14 is continuously illustrated as a compact, constructively contiguous unit. The illustration was selected for better overview since a separation in individual components can be suggested for constructive reasons, but does not have any influence on the applicability of the invention. Rather, it is essential for the invention that an antenna element effective for the emission of the position identification signal 15 is provided in the respective positions, in which the transmitting unit 14 is presented in the figures.

By means of the position identification signal 15, a relative position to the respective lighting device 10 can be approximately identified with the aid of this signal. This is the classical beacon functionality. In the combination of multiple position identification signals 15, thus, a raster or an orientation system arises, which improves the position identification by a terminal. If a lighting device 10 is fixedly installed, thus, an absolute position can also be derived from the relative position at the same time.

Moreover, it can also be provided that a transmitting unit 14 is integrated instead of a lighting means 12. Therein, for example in a configuration as a LED lighting means, one LED is removed from a LED support module, and an antenna is inserted instead. Similarly, it can be provided to attach an antenna with corresponding device for implementing a certain emission characteristic to a busbar, to which a lighting means is normally attached. Moreover, it can be provided that multiple transmitting units 14 are inserted in/on/instead of a respective lighting means 12.

An exemplary scenery in a supermarket, in which a lighting device 10 according to the invention is employable, is illustrated in FIG. 11 in severely simplified manner. Therein, lighting devices 10 according to the invention with each one lighting means 12 as well as a transmitting unit 14 are arranged on the ceiling of a room in the supermarket, which emit a position identification signal 15. This radio signal is directed. Herein, the transmitting unit 14 is installed in or on the lighting device 10 in the form of a ceiling lamp. In the super market, shopping carts 42 are moved between supermarket shelves 44. In an area between the shelves, which is represented by the reception area 46, radio signals can be disturbed by shelves 44 and in particular by the moving shopping carts 42. This in particular occurs in increased manner if a radio emitter 48 has been attached to a shelf 44 for the sake of simplicity. In contrast to an installation of radio emitters 48 in lower room height, in which interactions with moving shopping carts 42, shelves 44, machines and other items can arise, less disturbing influence by shelves 44 and other items is given with a signal irradiation from the top in contrast thereto.

Figure 12A:
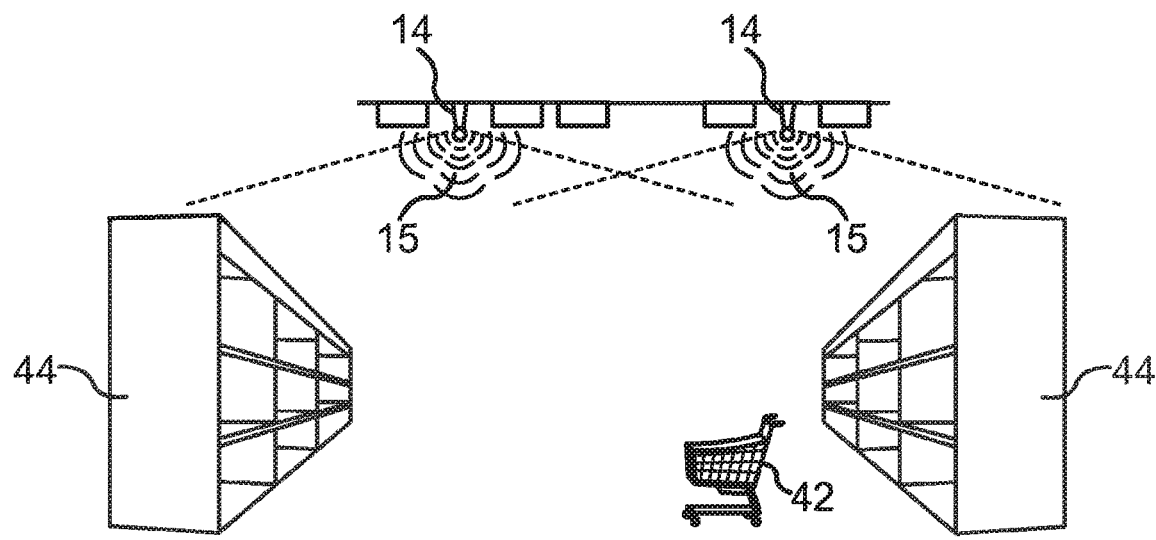
Figure 12B:
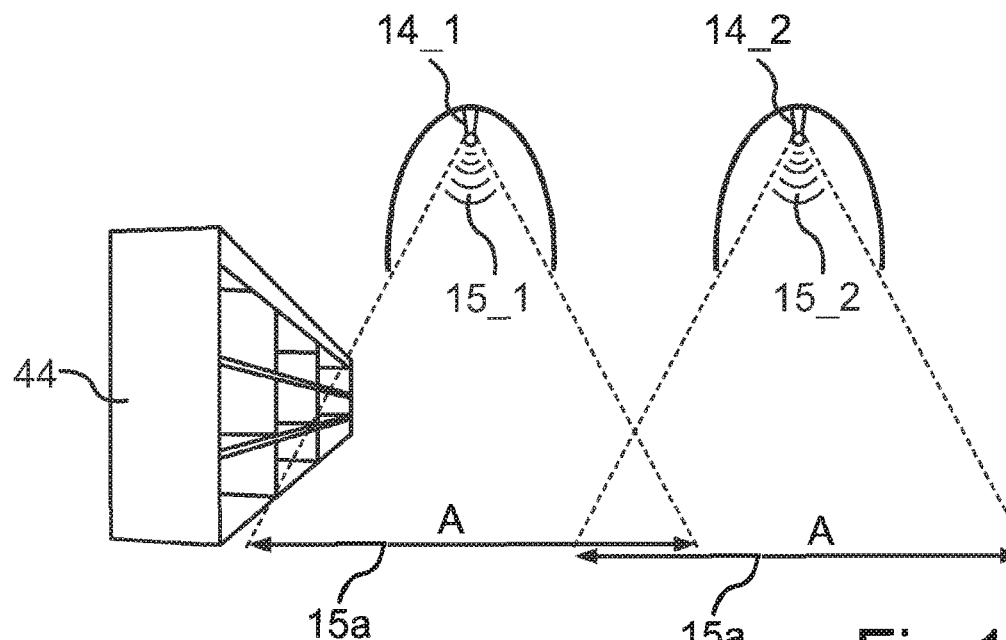

With a non-directed radio signal, as illustrated in FIG. 12*a*, a disturbance by unwanted reflections is often caused by items. The position identification signal 15 can be disturbed by reflections on the shelf 44 and/or on the ceiling installation. A disturbance by shopping carts 42 is also possible. Thereby, the location becomes inaccurate. The solution according to the invention for avoiding unnecessary reflections and thereby a disturbance of the signals for the purpose of a location as accurate as possible is illustrated in FIG. 12*b*. Herein, a ceiling installation for example each includes a transmitting unit 14 for emitting a position identification signal 15, which is projected to a respective signal cone A by means of reflection optics. In this manner, an adjustable, geometric radio coverage can for example be achieved, in particular by means of a slightly overlapping primary signal in the respective signal cones A1 and A2, respectively.

Figure 13:
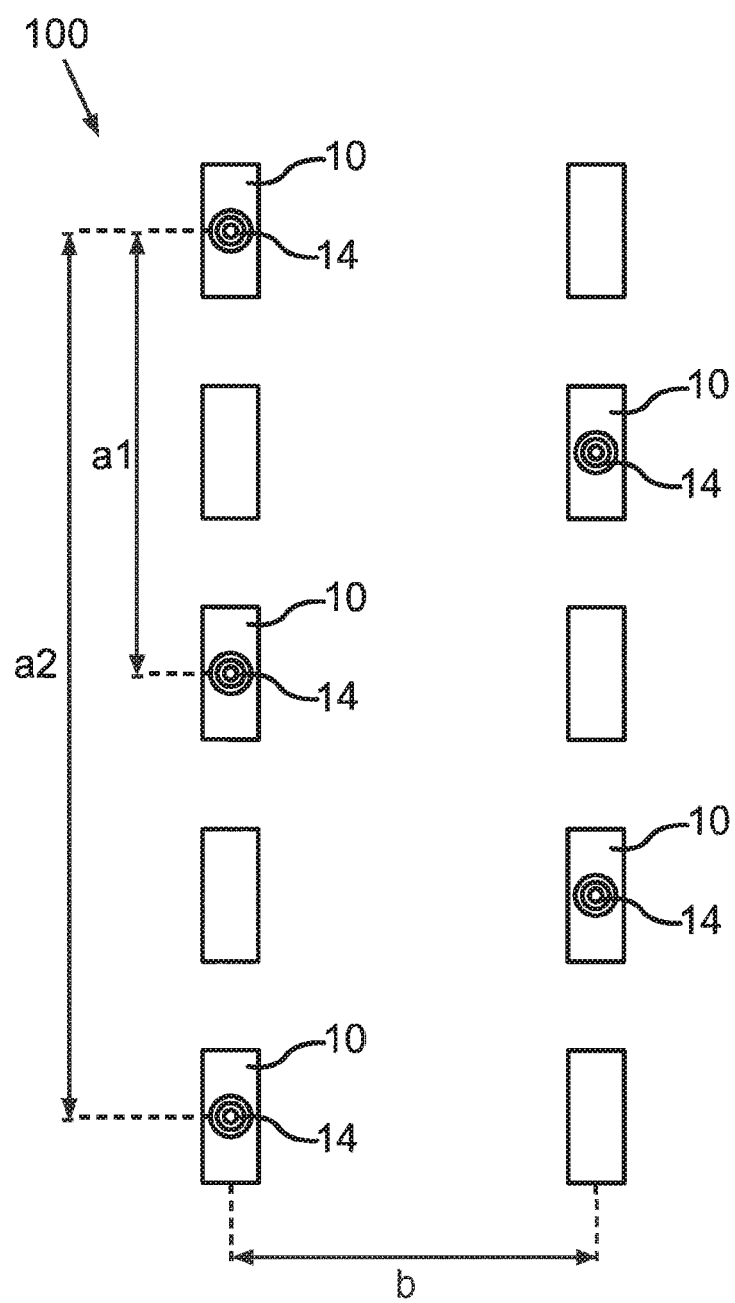

An advantageous embodiment of a lighting system 100 according to the invention is illustrated in FIG. 13. Herein, two rows of lamps, so-called light bands, are exemplarily illustrated, which are arranged in a distance b from each other. In longitudinal direction of the light band, a lighting device 10 according to the invention with a transmitting unit 14 and a lamp without transmitting unit are respectively alternatively arranged, whereby an alternating scheme in the distance a1 arises. Lighting devices (lamps) are homogeneously distributed in the lighting system 100 (lamp installation). Hereby, a uniform provision of position identification signals results.

Recommendable data for an installation of transmitting units in different ceiling heights are illustrated in the following overview. In ceiling heights of below 3 meters, the position identification signal should be adjusted to 3 to 5 meters of range. In ceiling heights between 5 and 8 meters, the position identification signal should be adjusted to 7 to 8 meters of range. In ceiling heights above 8 meters, the position identification signal should be adjusted to at least 10 meters of range. In this manner, particularly advantageous results in the position ascertainment accuracy can be achieved.

The embodiments only serve for explaining the invention and are not restricting for it. In particular, the generation of the light effect of the radio signals can be arbitrarily configured without departing from the spirit of the invention.

Thus, it was above shown how a (radio) beacon can be employed in a lamp with directed optics to achieve an improved positioning accuracy.

The invention claimed is:

1. A lighting device for providing a position identification signal comprising:
   an exterior housing comprising plastic;
   an electrical supply connection;
   a lighting source arranged within the exterior housing;
   an electronic operating device for the lighting source;
      wherein the electronic operating device is arranged within the exterior housing; wherein the electronic operating device is coupled between the electrical supply connection and the lighting source;

wherein the electronic operating device comprises a housing that includes plastic; and a transmitting unit including an antenna element; wherein the transmitting unit is arranged in the housing of the electronic operating device, wherein the transmitting unit is adapted to transmit the position identification signal in the form of a directed radio signal with a presettable emission characteristic in intended operation, wherein the position identification signal includes position determination data relating to a position of the transmitting unit and/or the lighting source.

2. The lighting device according to claim 1, wherein the transmitting unit or at least the antenna element of the transmitting unit effective for the emission of the position identification signal is arranged in a preset relative position to the lighting source.

3. The lighting device according to claim 1, wherein the lighting device comprises a light directing element, which is adapted to respectively direct the predominant part both of the emitted position identification signal and the light emitted by the lighting source.

4. The lighting device according to claim 1, wherein the antenna element effective for the emission of the position identification signal is adjustable with respect to an emission direction with respect to the lighting device and/or with respect to an aperture angle of an emission cone.

5. The lighting device according to claim 1, wherein the transmitting unit comprises a data processing unit for providing the position determination data, wherein the data processing unit is arranged spatially separated from the antenna element.

6. The lighting device according to claim 1, wherein the transmitting unit is coupled to the electronic operating device for its electrical self-supply.

7. A lighting system for providing position determination data comprising:

a plurality of lighting devices according to claim 1, wherein the lighting devices are arranged according to a presettable installation scheme for the intended operation, wherein the transmitting power of the respective emitted position identification signals and/or the respective emission characteristic are adjustable depending on an installation height.

8. The lighting system according to claim 7, wherein the lighting system is configured such that at least two position identification signals are receivable from respectively two different lighting devices of the plurality of lighting devices at least within 95 percent of an area lighted by the lighting system and/or at least three position identification signals are receivable from respectively three different lighting devices of the plurality of lighting devices at least within 80 percent of an area lighted by the lighting system.

9. A method for operating a lighting device of claim 1 with a lighting source and a transmitting unit comprising:

directed transmitting a position identification signal in the form of a radio signal with a presettable emission characteristic, wherein the position identification signal includes position determination data relating to a position of the transmitting unit and/or the lighting source.

* * * * *